United States Patent [19]
Lidman

[11] Patent Number: 5,471,669
[45] Date of Patent: Nov. 28, 1995

[54] COUPON SAVINGS ACCOUNT SYSTEM

[75] Inventor: David G. Lidman, West Roxbury, Mass.

[73] Assignee: Alchemist and Company, Inc., West Roxbury, Mass.

[21] Appl. No.: 214,613

[22] Filed: Mar. 17, 1994

[51] Int. Cl.$^6$ .................................................... G06K 19/00
[52] U.S. Cl. ............................ 235/383; 235/487; 235/379; 902/25
[58] Field of Search ...................................... 235/487, 383, 235/379; 902/25

[56] References Cited

U.S. PATENT DOCUMENTS 4,949,256  8/1990  Humble .................................. 235/487

*Primary Examiner*—Harold Pitts
*Attorney, Agent, or Firm*—Wolf, Greenfield & Sacks

[57] ABSTRACT

The present invention discloses a coupon savings account system for transferring coupon amounts from a store account to a purchaser's account to be used for educational or other purposes. In this system, coupon amounts are totaled and transferred to an account read from an account card. The system connects with the banking system to complete the transfer of funds from the store's account to the identified account. The system also permits transfer of matching funds by companies and organizations. The system also allows for operation of coupons according to existing practices whereby the total of the coupons is debited from the balance to be paid by the purchaser.

19 Claims, 2 Drawing Sheets

COUPON SAVINGS ACCOUNT SYSTEM

FIELD OF THE INVENTION

The present invention relates to an account crediting system, and, more particularly, to a system wherein an amount equal to the total value of redeemed coupon is transferred to a savings account.

BACKGROUND OF THE INVENTION

Coupons provide a major expenditure for advertising and promotion of product manufacturers. A large portion of the U.S. consumers use coupons, at least occasionally. In addition to manufacturers, stores participate in coupon promotions by issuing their own coupons or increasing the value of a manufacturer s coupons, However, coupon use is limited because coupons have no inherent value and cannot be converted directly into cash. Many people do not use coupons due to the inconvenience of cutting out coupons and matching coupons to purchases. Use of coupons is also limited due to the perceived minimal value of coupons.

In the United States, people have a very low savings rate. This is of particular concern in the education arena as costs have increased. The importance of a college education in today's society has been increasing. Providing a college education has become difficult for American families as the cost at both private and public schools has been increasing dramatically.

Therefore, a need exists to assist families in saving for educational purposes. A need also exists for improved uses of coupons which can assist in funding education or other purposes.

SUMMARY OF THE INVENTION

The present invention overcomes the foregoing deficiencies in the existing coupon redemption procedures and provides a system for saving for educational or other purposes which uses and benefits from coupons.

The present invention provides a unique system which can transfer funds in relation to redemption of coupons. In one aspect of the present invention, a cash register totals coupon information entered from a barcode reader. The cash register communicates with a bank communication system for transferring the coupon total between accounts. In another aspect of the present invention, educational account information is recorded on an account card. The information on the account card is entered into the cash register by means of a card reader. The information is transferred to the bank communication system for making the necessary funds transfers.

The system of the present invention can be used to convert coupon values to savings for education. For this use, a purchaser opens an account for educational savings purposes, and is issued a card or cards identifying that account. When making purchases using coupons, the account identification card is read by a card reader. The cash register communicates the account and coupon information to the bank communication system. Funds are then transferred by the bank communication system, preferably using electronic transfer, from the store's account to the purchaser's educational savings account.

According to another aspect of the present invention, persons can credit coupon amounts to any account as identified by an account card. Therefore, family and friends of the account holder can use their coupon purchases to credit the account and assist in education financing. In another aspect of the present invention, companies and other organizations can participate in the system by matching contributions to the account. Funds from the company or organization account are automatically transferred to the purchaser's account when the coupons are redeemed.

It is an object of the present invention to provide a system which converts coupon value into a savings account for educational or other purposes. It is another object of the present invention to provide a system which does not significantly increase the complexity of the current coupon redemption procedures and requirements. It is another object of the present invention to permit multiple persons to credit coupon values to one account. It is another object of the present invention to provide for matching contributions from companies and other organizations.

With these and other objects, advantages and features of the invention that may become apparent, the nature of the invention may be more clearly understood by reference to the following detailed description of the invention, the appended claims and the several drawings attached hereto.

DETAILED DESCRIPTION OF THE PREFERRED EMBODIMENT

Figure 1:
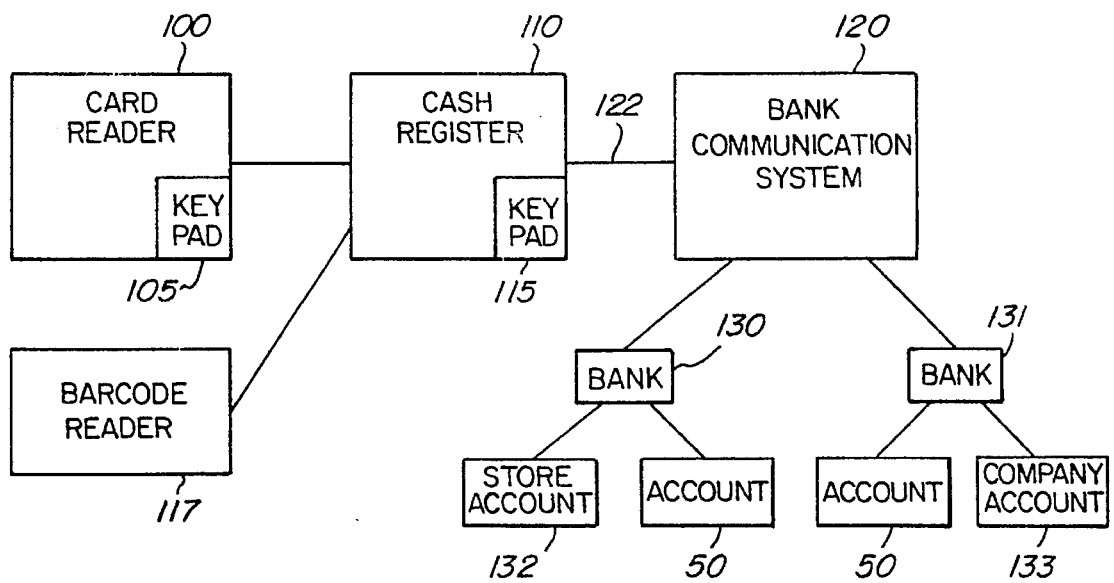
FIG. 1 is a block diagram of a coupon savings account system according to a preferred embodiment of the present invention.

Referring now in detail to the drawings, there is illustrated in FIG. 1 a block diagram representing a system for crediting coupons to a purchaser's account 50. As illustrated in FIG. 1, a cash register 110 is connected to a barcode reader 117 and a card reader 100. The barcode reader 117 is used to read barcodes on products and to automatically enter the products and prices into the cash register 110. The barcode reader 117 can also be used to read barcodes on coupons and to automatically transfer the coupon amounts to the cash register 110. Alternatively, the key pad 115 of the cash register 110 can be used to enter products, prices and coupon amounts.

Figure 2:
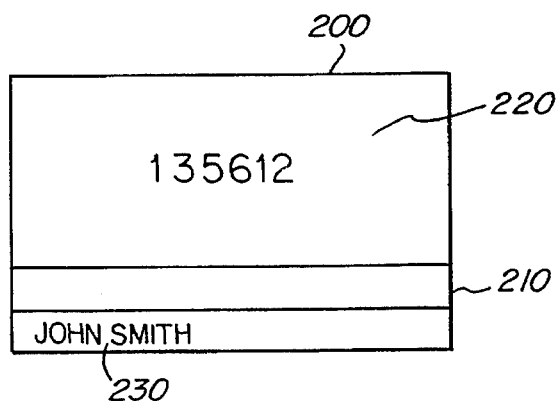
FIG. 2 is a representation of an account card as used in connection with the coupon savings account system of FIG. 1.

Each person using the system would be issued an account card for identifying an account 50 at a bank 130, 131. The card reader 100 is used to read account information from the account card. A typical account card 200 is illustrated in FIG. 2. An account card 200 includes a person's name 230, an account number 220, and an account identifying information area 210. The account identifying information area 210 can be a magnetic strip or a barcode which identifies a specific account 50. If the account identifying information area 210 is a barcode, it would be read by the barcode reader 117. Otherwise, the magnetic strip is read by the card reader 100. Alternatively, the account number 220 can be entered manually using the key pad 115 on the cash register 110 or the key pad 105 on the card reader 100.

The cash register 110 is also connected, conventionally by telephone lines 122, to a bank communication system 120.

The bank communication system 120 is a conventional system wherein funds can be electronically transferred between accounts at various banks 130, 131.

According to a preferred embodiment of the present system, the cash register 110 totals the value of all the coupons presented by a purchaser, including manufacturer's coupons, store coupons and store increases of manufacturer's coupons. The total is transferred to the bank communication system along with the account information entered from the account card 200. The total of the coupons is then electronically transferred from the store's account 132 at a bank 130 to the purchaser's account 50, whether at the same bank 130 or another bank 131. The purchaser's account 50 is reviewed and reconciled by the purchaser as with any other bank account.

Many companies and organizations support educational programs and assist in funding savings for employees or members. The system according to the present can accommodate and simplify such assistance. Certain accounts 50 can be identified as subject to a matching funds program. The information on the matching funds program can be included in the account identifying information area 210 of the account card 200. Thus, the matching funds program information is read when the card 200 is read. Alternatively, a separate card can be used to identify a matching funds program. Also, the information on matching funds can be stored within the bank communication system in connection with the specified accounts. If a matching funds program is identified, information on the program is transferred to the bank communications system 120. A second transfer of funds is made from a company account 133 to the purchaser's account 50, also whether at the same bank 131 or a different bank 130. The second transfer would be in an amount proportional to the total value of coupons redeemed.

The hardware components for creating a system according to the present invention exist, and many components are already in use in stores. Currently, some stores allow purchasers to use credit or debit cards for making purchases. When a credit or debit card is used, account identifying information is read from the card by a card reader. A personal identification number (PIN) can be entered on a key pad of the card reader to prevent others from fraudulently using the debit or credit card. The key pad is also used to enter information about the purchase, such as the balance to be charged to the purchaser. The card reader is connected to a bank communication system for obtaining authorization for the transaction, or to complete the transaction. The card reader may be connected to the bank communication system through a cash register, which would automatically provide the purchase information. Since these components are controlled by microprocessors, the software of the components could be adjusted to implement the system according to the present invention.

Figure 3:
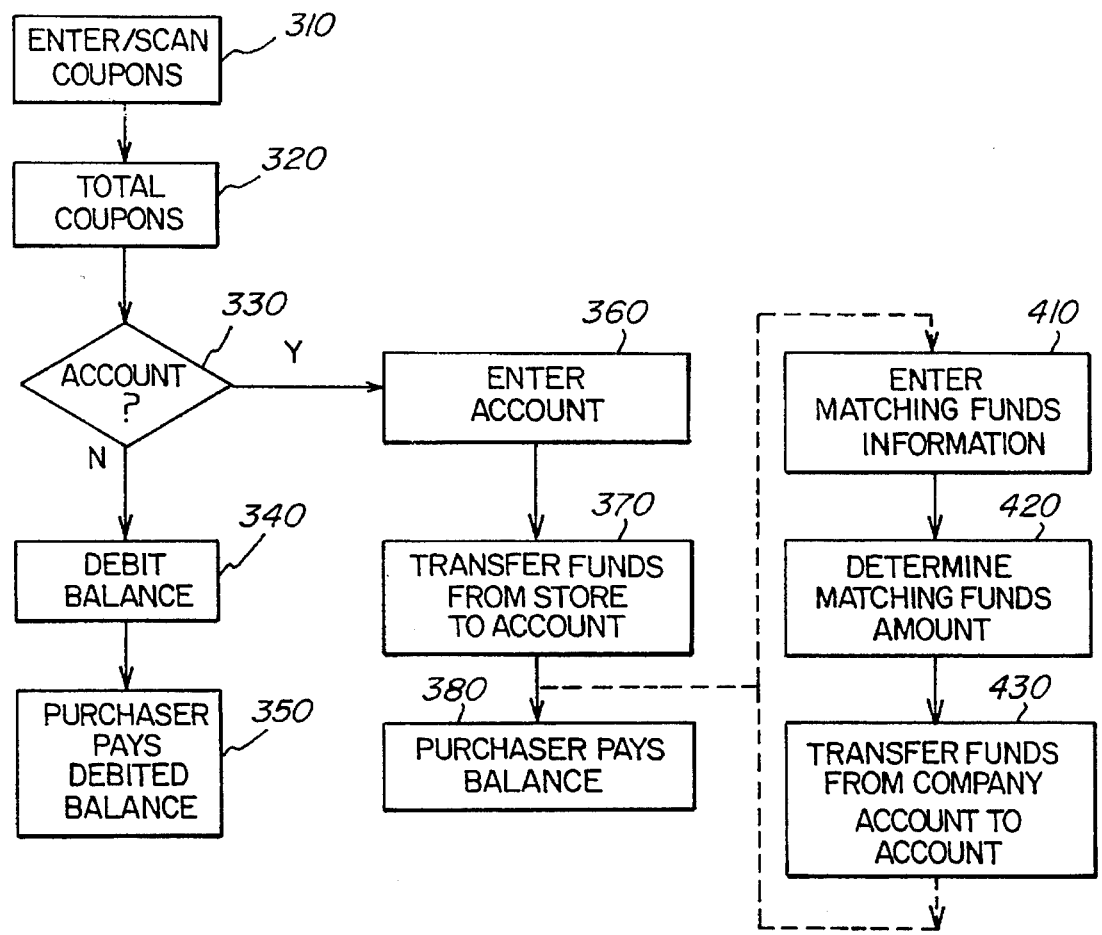
FIG. 3 is a block flow diagram of operation of the coupon savings account system of FIG. 1.

FIG. 3 is a block flow diagram illustrating operation of a system according to the present invention as would be implemented in the cash register 110. At step 310, the coupons are entered or scanned so that the values are stored in the cash register. The coupon can either be scanned by the barcode reader 117 or entered by the cashier on the key pad 115 of the cash register 110. The cash register then totals the value of all presented coupons at step 320. At step 330, a determination is made as to whether the coupon value is to be credited to an account. If the amount is not to be credited to an account, the purchase balance is debited by the amount of the coupon total at step 340. At step 350, the customer would then pay the debited balance amount. If the account is to be credited, information identifying the account is entered at step 360. The account identifying information can be entered using the card reader 100, the barcode reader 117 or the key pad 115 on the cash register, as discussed above. At step 370, funds in the amount of the total of the coupons are transferred from the store's bank account 132 to the purchaser's bank account 50 identified from the account card 200. Finally, at step 380, the customer pays the entire purchase balance without having been reduced by the coupons.

In order to implement a matching funds program, steps 410–430 in FIG. 3 are used. In step 410, information about the matching funds program is entered. This information would include information identifying the company account 133 and the proportion of matching funds. The matching funds information can be entered from the account card 50 at the same time the account information is entered. Then, at step 420, the amount robe transferred is determined by the product of the total coupon amount and the proportion amount. At step 430, the funds are transferred from the company's account 133 to the purchaser's account 50.

Figure 4:
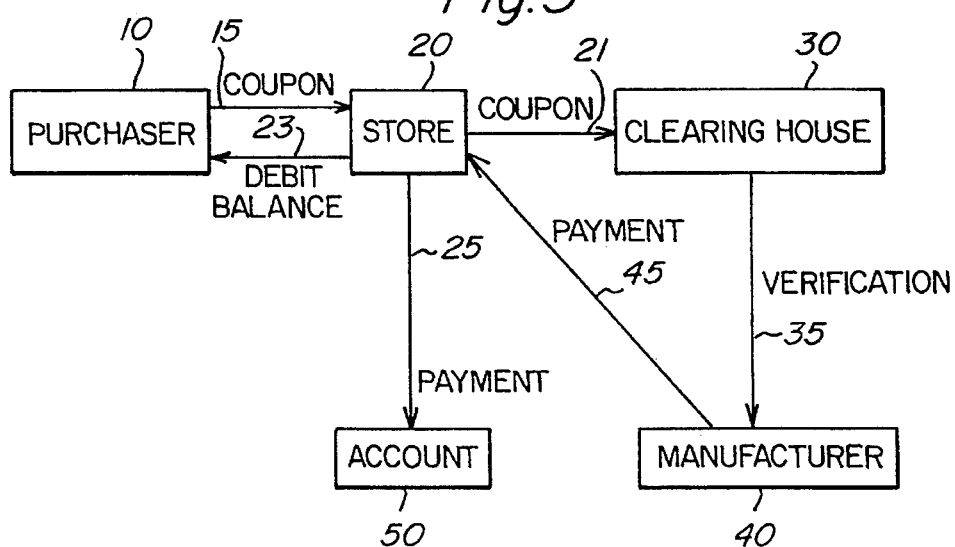
FIG. 4 is a block diagram of coupon redemption procedures using the coupon savings system of FIG. 1.

FIG. 4 illustrates the use of the present invention in relation to existing coupon redemption procedures. Under existing coupon procedures, a purchaser 10 presents a manufacturer's coupon 15 to a store 20 in connection with purchase of the product covered by the coupon. The store 20 debits the balance of purchases by the coupon amount 23, and the purchaser 10 pays a reduced amount for the product to the store 20. The store 20 then presents the coupons which it has received 21 to a clearinghouse 30. The clearinghouse 30 verifies that the products covered by the coupons were sold by the store 20 and provides the verification 35 and total amount of the coupons to the manufacturer 40 who issued the coupons. The manufacturer 40 then pays 45 the store 20 the value of the coupons, plus a processing fee.

Often stores 20 will have their own promotions by providing their own coupons or increasing the value of a manufacturer's coupon. In such a case, the value of the coupon simply reduces the store's receipts and the coupons are not transferred to the clearinghouse 30.

According to the present invention, an account 50, which is selected by the purchaser 10, receives a payment 25 from the store which represents the value of the coupons used by the purchaser 10. The debit to purchase balance 23 does not occur. Rather, the purchaser 10 pays the total balance for the goods purchased. The value of the coupons 15 is transferred to the purchaser's account 50 by the coupon savings account system according to the present invention. The net receipts to the store 10 are unaffected by use of the present invention. As with the existing coupon system, the store 20 has reduced receipts by the amount of the coupons. The receipts are not directly reduced by the amount of the coupon, but the amount of the coupon is transferred from the store's account to the purchaser's account 50. As with the existing coupon system, for manufacturer's coupons, the store transfers the coupon to the clearinghouse 30 and is reimbursed by the manufacturer 40 for the amount of the coupon. For store coupons and promotions, the value of the coupon comes from the store's 20 own accounts and is part of its advertising and promotional expenses.

The purchaser's account 50 can be treated as any other bank account by the purchaser 10. Preferably, the account is used to save for educational purposes, but could be used for any purpose as agreed between the purchaser and the bank. As with ordinary bank accounts, the purchaser would receive an account statement periodically, such as monthly, to review account activity for reconciliation purposes.

Under the present system, the purchaser 10 presenting the coupons and the account card 200 need not be the actual owner of the account 50. Therefore, persons could transfer coupon values to accounts of friends and relatives in order to assist in funding their educational expenses. Additionally, the account card 200 need not be limited to identifying a single account. Currently, debit cards can be used to identify more than one account, such as a checking account and a savings account. Similarly, the account card 200 could identify a set of accounts and the key pad 105 of the card reader 100 could be used by the purchaser 10 to identify which account associated with the account card should be credited.

Although preferred embodiments are specifically illustrated and described herein, it would be appreciated that modifications and variations of the present invention are covered by the above teachings and within the purview of the appended claims without departing from the spirit and intended scope of the invention.

What is claimed is:

1. A product coupon savings system comprising:

a cash register for totaling one or more product coupons in connection with product purchases;

account means for identifying a purchaser's money account to receive and accumulate funds transferred through said product coupon savings system; and crediting means, communicating with said cash register, for crediting said identified money account in an amount equal to said total of said product coupons.

2. The product coupon savings system of claim 1, further comprising entering means for entering coupons into said cash register.

3. The product coupon savings system of claim 2, wherein said entering means includes a barcode reader.

4. The product coupon savings system of claim 1, wherein said identified money account means includes reading means for reading an account card identifying said account.

5. The product coupon savings system of claim 4, wherein said identified money account/card has a barcode identifying said account and said reading means includes a barcode reader.

6. The product coupon savings system of claim 4, wherein said account card has a magnetic strip storing information identifying said identified money account and said reading means includes a reader for reading said information stored on said magnetic strip.

7. The product coupon savings system of claim 4, wherein an account code is printed on said account card and wherein said reading means includes a key pad on said cash register for entering said account code on said account card.

8. The product coupon savings system of claim 1, wherein said crediting means includes:

a transfer center communicating with at least one bank, said identified money account being at said bank;

communications means for communicating said product coupon total and said identified money account from said cash register to said transfer center; and wherein said transfer center communicates with said bank to transfer funds equal to said product coupon total to said identified money account.

9. The product coupon savings system of claim 8, further comprising:

a store receiving said product coupons;

store communicating means for communicating to said transfer center information identifying an account of said store at a bank communicating with said transfer center; and wherein said transfer center communicates with said bank of said store to transfer funds equal to said product coupon total from said account of said store.

10. The product coupon savings system of claim 9, further comprising:

verification means for verifying said product coupons; and paying means for transferring funds proportional to said product coupon total to said account of said store upon verification of said product coupons by said verification means.

11. The product coupon savings system of claim 10, wherein said verification means is a clearinghouse.

12. The product coupon savings system of claim 1, further comprising:

selecting means for selecting one of said identified money account and a balance of purchases;

debiting means for reducing said balance of purchases by said product coupon total when said balance is selected; and wherein said identifying means and said crediting means operate only when said identified money account is selected.

13. The product coupon savings system of claim 1, further comprising:

matching funds means for debiting a matching funds account in an amount proportional to said product coupon total and for crediting said identified money account in said amount proportional to said product coupon total.

14. The product coupon savings system of claim 13, wherein said matching funds means includes:

means for identifying said matching funds account; and means for identifying said proportion of said product coupon total.

15. The product coupon savings system of claim 13, wherein said matching funds means includes memory means for associating said matching funds account and said proportion of said product coupon total with said identified money account.

16. The product coupon savings system of claim 15, wherein said memory means is part of an account card identifying said identified money account.

17. A method for redeeming product coupons comprising the steps of:

totaling one or more product coupons to be redeemed in connection with product purchases to determine a product coupon total;

identifying a purchaser's money account to receive and accumulate funds from redeemed coupons; and crediting said identified money account in an amount equal to said product coupon total.

18. A method for redeeming product coupons as in claim 17, further comprising the steps of:

selecting one of said identified money account and a balance of purchases;

reducing said balance of purchases by said product coupon total if said balance is selected; and wherein said identifying and crediting steps are performed if said identified money account is selected.

19. A method for redeeming product coupons as in claim 17, wherein said identifying step includes reading information from an account card identifying said identified money account.

* * * * *

EX PARTE REEXAMINATION CERTIFICATE (4964th)
United States Patent
Lidman

(10) Number: US 5,471,669 C1
(45) Certificate Issued: Jul. 20, 2004

(54) COUPON SAVINGS ACCOUNT SYSTEM

(75) Inventor: David G. Lidman, West Roxbury, MA (US)

(73) Assignee: Alchemist and Company, Inc., West Roxbury, MA (US)

Reexamination Request:
No. 90/006,039, Jun. 20, 2001

Reexamination Certificate for:
Patent No.: 5,471,669
Issued: Nov. 28, 1995
Appl. No.: 08/214,613
Filed: Mar. 17, 1994

(51) Int. Cl.[7] ............... G06K 15/00; G06K 19/00; G06F 17/60
(52) U.S. Cl. ............... 235/383; 235/379; 235/487; 902/25; 705/14
(58) Field of Search ............... 235/383, 379, 235/380, 487, 381; 902/25; 705/14, 16, 17, 35, 39

(56) References Cited

U.S. PATENT DOCUMENTS

| | | | |
|---|---|---|---|
| 4,722,055 A | | 1/1988 | Roberts |
| 4,745,267 A | * | 5/1988 | Davis et al. ............... 235/379 |
| 4,750,119 A | | 6/1988 | Cohen et al. |
| 4,752,877 A | | 6/1988 | Roberts et al. |
| 4,882,675 A | * | 11/1989 | Nichtberger et al. ............... 705/14 |
| 4,941,090 A | | 7/1990 | McCarthy |
| 5,025,372 A | | 6/1991 | Burton et al. |
| 5,056,019 A | | 10/1991 | Schultz et al. |
| 5,117,355 A | | 5/1992 | McCarthy |
| 5,200,889 A | * | 4/1993 | Mori ............... 705/14 |
| 5,202,826 A | | 4/1993 | McCarthy |
| 5,233,514 A | | 8/1993 | Ayyoubi et al. |
| 5,287,268 A | | 2/1994 | McCarthy |
| 5,297,026 A | | 3/1994 | Hoffman |
| 5,302,811 A | * | 4/1994 | Fukatsu ............... 235/381 |
| 5,513,102 A | | 4/1996 | Auriemma |
| 5,621,640 A | | 4/1997 | Burke |
| 5,765,141 A | | 6/1998 | Spector |
| 5,774,870 A | | 6/1998 | Storey |
| 5,787,404 A | | 7/1998 | Fernandez-Holmann |
| 5,794,210 A | | 8/1998 | Goldhaber et al. |
| 5,806,045 A | * | 9/1998 | Biorge et al. ............... 705/14 |
| 5,809,484 A | | 9/1998 | Mottola et al. |
| 5,855,008 A | | 12/1998 | Goldhaber et al. |
| RE36,116 E | | 2/1999 | McCarthy |
| 5,915,007 A | | 6/1999 | Klapka |
| 5,915,244 A | | 6/1999 | Jack et al. |
| 5,953,709 A | | 9/1999 | Gilbert et al. |
| 5,974,398 A | | 10/1999 | Hanson et al. |
| 5,987,436 A | | 11/1999 | Halbrook |
| 5,991,736 A | | 11/1999 | Ferguson et al. |
| 6,058,371 A | | 5/2000 | Djian |
| 6,088,682 A | * | 7/2000 | Burke ............... 705/17 |
| 6,112,191 A | * | 8/2000 | Burke ............... 705/41 |
| 6,164,533 A | * | 12/2000 | Barton ............... 235/380 |
| 2002/0133401 A1 | * | 9/2002 | Mount et al. ............... 705/14 |

FOREIGN PATENT DOCUMENTS

| JP | 2002-92520 A | * | 3/2002 |
| WO | WO 00/28488 A1 | * | 5/2000 |

OTHER PUBLICATIONS

"NestEeggz", http://ivillage.nesteggz.com, printed on Mar. 26, 2003, original posting date unknow.*

"Business World in plastic credit times a card that rewards paying cash; Cash card discounts go into consumer's savings account" Paula Maynard, United Press International, Nov. 2, 1981, 4 pp.

"Kroger Helps Send Ohio Children to College, Shoppers Earn Tuition Units with Every Dollar They Charge to Their Kroger Visa® Card," Company Press Release, Source: Ohio Tuition Trust Authority, Mar. 30, 2000, 2 pp.

* cited by examiner

Primary Examiner—Jared J. Fureman

(57) ABSTRACT

The present invention discloses a coupon savings account system for transferring coupon amounts from a store account to a purchaser's account to be used for educational or other purposes. In this system, coupon amounts are totaled and transferred to an account read from an account card. The system connects with the banking system to complete the transfer of funds from the store's account to the identified account. The system also permits transfer of matching funds by companies and organizations. The system also allows for operation of coupons according to existing practices whereby the total of the coupons is debited from the balance to be paid by the purchaser.

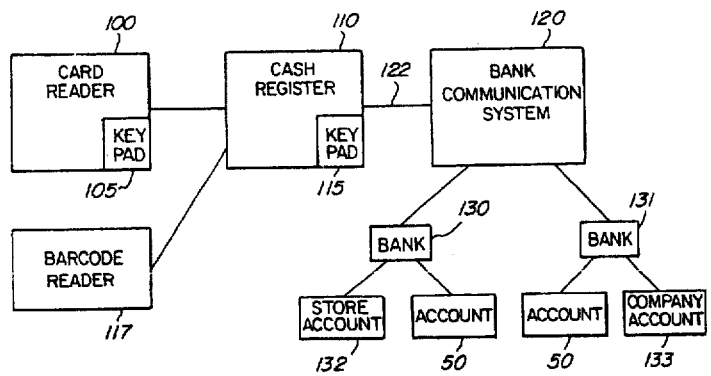

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

Claims 1–11, 13–17 and 19 are cancelled.

Claims 12 and 18 are determined to be patentable as amended.

New claims 20–31 are added and determined to be patentable.

12. [The] A product coupon savings system [of claim 1, further] comprising:

a cash register for totaling one or more product coupons in connection with product purchases;

account means for identifying a purchaser's money account to receive and accumulate funds transferred through said product coupon saving systems;

crediting means, communicating with said cash register, for crediting said identified money account in an amount equal to said total of said product coupons;

selecting means for selecting one of said identified money account and a balance of purchases;

debiting means for reducing said balance of purchases by said product coupon total when said balance is selected; and wherein said identifying means and said crediting means operate only when said identified money account is selected.

18. A method for redeeming product coupons [as in claim 17, further] comprising the steps of:

totaling one or more product coupons to be redeemed in connection with product purchases to determine a product coupon total;

identifying a purchaser's money account to receive and accumulate funds from redeemed coupons;

crediting said identified money account in an amount equal to said product coupon total;

selecting one of said identified money account and a balance of purchases;

reducing said balance of purchases by said product coupon total if said balance is selected; and wherein said identifying and crediting steps are performed if said identified money account is selected.

20. A method for redeeming product coupons comprising the steps of:

totaling one or more product coupons to be redeemed in connection with product purchases to determine a product coupon total;

identifying a purchaser's money account to receive and accumulate funds from redeemed coupons;

crediting said identified money account in an amount equal to said product coupon total;

selecting one of said identified money account and a balance of purchases;

reducing said balance of purchases by said product coupon total if said balance is selected; and

*wherein said identifying and crediting steps are performed if said identified money account is selected, and wherein funds in said identified money account are made available for withdrawal without being associated with a purchase.*

*21. The method of claim 20, wherein the step of identifying a purchaser's money account comprises:*

*identifying a plurality of purchaser's money accounts to receive and accumulate funds from redeemed coupons; and*

*the step of crediting said identified money accounts comprises:*

*crediting the plurality of purchaser's money accounts in an amount equal in the aggregate to said product coupon total.*

*22. The method of claim 21, wherein the step of crediting comprises:*

*crediting a portion of said product coupon total to a money account that is maintained for at least one person other than the purchaser.*

*23. The method of claim 20, wherein the step of totaling one or more product coupons comprises:*

*totaling one or more product coupons to be redeemed in connection with product purchases made by a first purchaser to determine a first product coupon total, and*

*totaling one or more product coupons to be redeemed in connection with product purchases made by a second purchaser different from the first purchaser to determine a second product coupon total;*

*said step of identifying a purchaser's money account comprises:*

*identifying a first purchaser's money account to receive and accumulate funds from redeemed coupons, and*

*identifying a second purchaser's money account that is the same as the first purchaser's money account to receive and accumulate funds from redeemed coupons; and*

*said step of crediting said identified money account comprises:*

*crediting said identified first purchaser's money account in an amount equal to said first product coupon total, and*

*crediting said identified second purchaser's money account in an amount equal to at least a portion of the second product coupon total.*

*24. The method of claim 23, wherein at least one of the first and second purchasers has no ownership right in the funds after the funds are credited in said first and second purchaser's money account.*

*25. The method of claim 20, wherein the step of totaling one or more product coupons comprises:*

*multiplying the product coupon total by an increase value to determine a coupon increase; and*

*said step of crediting said identified money account comprises:*

*crediting said identified money account in an amount equal to said product coupon total and said coupon increase.*

*26. The method of claim 20, wherein the step of identifying a purchaser's money account comprises:*

*identifying a purchaser's money account to receive and accumulate funds from redeemed coupons by inputting information representing at least one money account selected by the purchaser from a plurality of selectable money accounts.*

27. *The method of claim 26, wherein the step of identifying comprises:*

*receiving manually input selection information representing the at least one money account selected by the purchaser.*

28. *The method of claim 27, wherein the step of identifying comprises:*

*receiving input representing a selection of one of a plurality of money accounts identified with an account card of the purchaser.*

29. *The method of claim 20, further comprising:*

*determining a matching funds amount equal to an amount determined based on said product coupon total; and said step of crediting said identified money account comprises:*

*crediting said identified money account in an amount equal to said product coupon total and said matching funds amount.*

30. *The method of claim 29, wherein said matching funds amount is provided by an entity whose identity is determined based on information provided in relation to the purchaser's account card.*

31. *The method of claim 29, wherein said matching funds amount is equal to an amount proportional to said product coupon total.*

* * * * *